P. D. BARBER & F. B. McQUEEN.
SHARPENING DEVICE FOR LAWN MOWERS.
APPLICATION FILED DEC. 18, 1909.

977,363.

Patented Nov. 29, 1910.

Witnesses
Hugh H. Ott
Wm Bagger

Inventors
Percy D. Barber
Frederick B. McQueen
By Victor J. Evans
Attorney

UNITED STATES PATENT OFFICE.

PERCY D. BARBER, OF AMHERST, AND FREDERICK B. McQUEEN, OF BROWNHELM, OHIO.

SHARPENING DEVICE FOR LAWN-MOWERS.

977,363.

Specification of Letters Patent.

Patented Nov. 29, 1910.

Application filed December 18, 1909. Serial No. 533,938.

*To all whom it may concern:*

Be it known that we, PERCY D. BARBER and FREDERICK B. McQUEEN, citizens of the United States of America, residing at Amherst and Brownhelm, respectively, in the county of Lorain and State of Ohio, have invented new and useful Improvements in Sharpening Devices for Lawn-Mowers, of which the following is a specification.

This invention relates to sharpening devices for lawn mowers, and it has for its object to provide a sharpening device capable of being easily and quickly attached to a lawn mower of ordinary construction for the purpose of sharpening the knives or cutters while the lawn mower is in operation.

A further object of the invention is to provide an attachment of simple and convenient form, whereby the abrading or sharpening member may be conveniently adjusted with relation to the knives or cutters.

Further objects of the invention are to simplify and improve the general construction and operation of the class of devices referred to above.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

Figure 1:
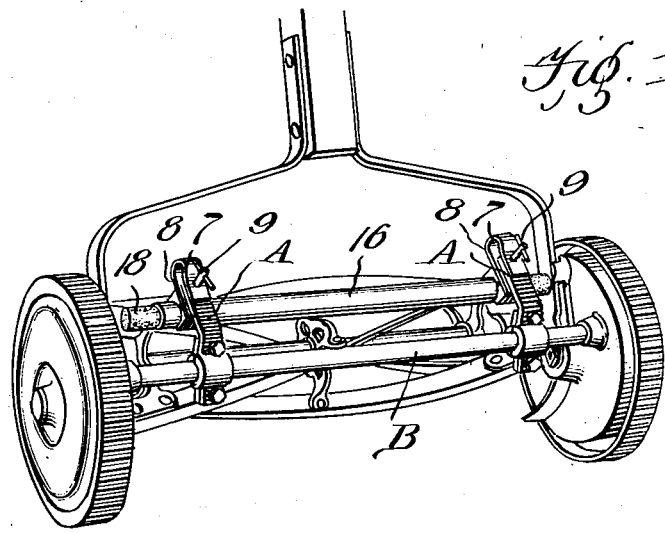
Figure 2:
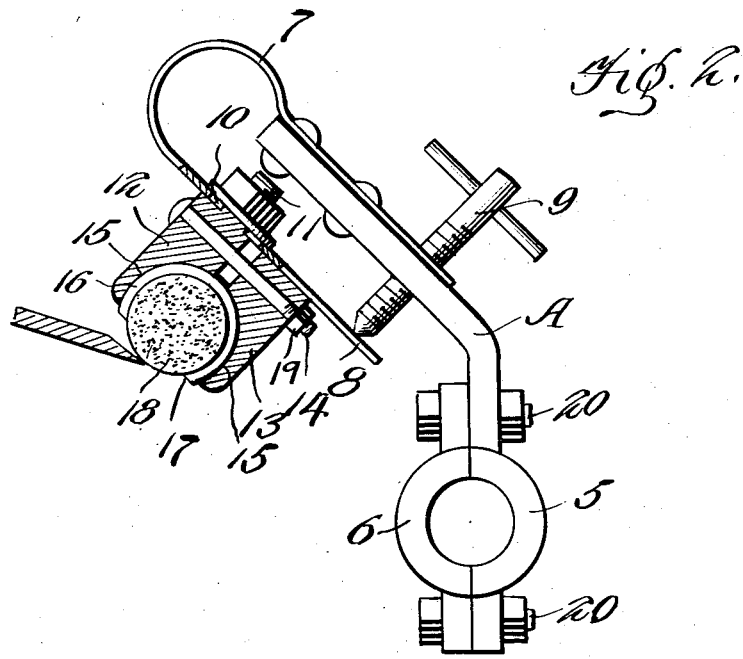

In the drawing,—Figure 1 is a perspective view, showing a lawn mower equipped with the improved attachment. Fig. 2 is a side elevation and partial section of the sharpening attachment detached.

Corresponding parts in both figures are denoted by like characters of reference.

In the construction of the improved device two brackets A, A are provided which have a semi-circular seat 5 coöperating with a clip 6, whereby the bracket may be firmly clamped and secured upon a portion of the frame, such as the base bar B of an ordinary lawn mower.

Each of the brackets A is provided with a yoke-shaped spring 7, which is firmly secured thereto, one of the leaves 8 of said spring being spaced from the bracket member with which it is connected, and said bracket member being equipped with a set screw 9, whereby the position of the leaf 8 may be adjusted.

Each of the leaves 8 is provided with a slot 10 for the passage of a bolt 11 carrying a clamping member 12 with which a second clamping member 13 is adjustably connected by means of a bolt 14. The clamping members 12, 13 are provided in their opposed faces with arcuate seats 15 for the reception of a cylindrical sleeve or holder 16 having a slot 17 extending through the entire length thereof, said sleeve or holder being for the reception of a cylindrical abrading bar or sharpener 18, a portion of which extends through the slot 17. It is obvious that by tightening the nut 19 upon the bolt 14 the abrading bar will be firmly clamped and secured, and it will also be seen that by rotating said abrading bar upon its axis, which may be done by slightly loosening the nut 19, various portions of the surface of said abrading bar may be successively exposed for use.

The device including the two brackets A, A is secured by means of the clamping members 6 upon the brace bar B, and it will be readily seen that by adjusting the clamping members 12 upon the spring leaves 8 and by properly adjusting said leaves by means of the set screws 9, the abrading bar may be presented in suitable position for engagement with the knives or cutters. Wear upon the parts may be compensated for by proper adjustment of the set screws 9. The device, when not required for present use, may be swung to an inoperative position by loosening the nuts upon the bolts 20 which connect the clips or clamps 6 with the bracket members A, after which by retightening the nuts the device will be held securely in such position as not to interfere with the usual operation of the lawn mower.

Having thus described the invention, what is claimed as new, is:—

1. A pair of bracket members having spring leaves connected therewith, means for adjusting the spring leaves, clamping members carried by said spring leaves, and an abrading member carried by the clamps.

2. A pair of clamping members having spring leaves connected therewith, set screws bearing against said spring leaves, clamping members adjustably connected with the spring leaves, and an abrading member carried by said clamping members.

3. A pair of bracket members having clamping devices, spring leaves connected with said bracket members, set screws bearing against the spring leaves, clamping members adjustably connected with the spring leaves, and an abrading member carried by the clamping members.

4. In a device of the character described, a pair of bracket members, securing means for the same, spring leaves connected with the bracket members, clamping members connected adjustably with the spring leaves, means for adjusting the tension of the latter, a slotted tubular sleeve seated between the clamping members, and a cylindrical abrading member mounted in said slotted sleeve.

In testimony whereof we affix our signatures in presence of two witnesses.

PERCY D. BARBER.
FREDERICK B. McQUEEN.

Witnesses:
AMELIA Y. BARBER,
LILLIAN J. BARBER.